Patented Oct. 25, 1949

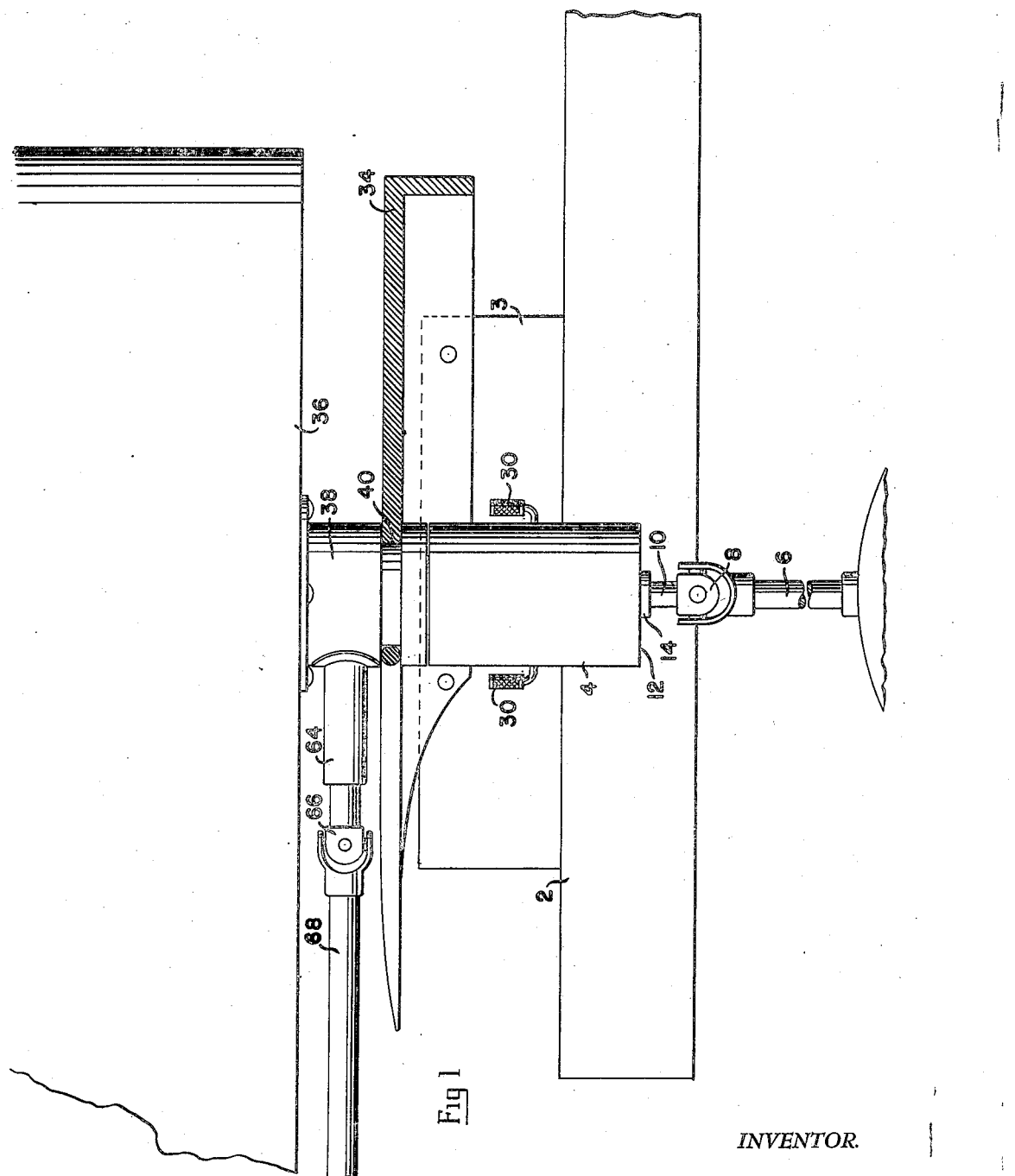

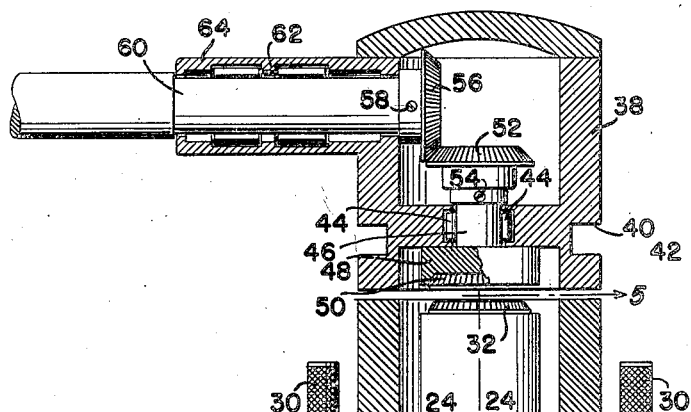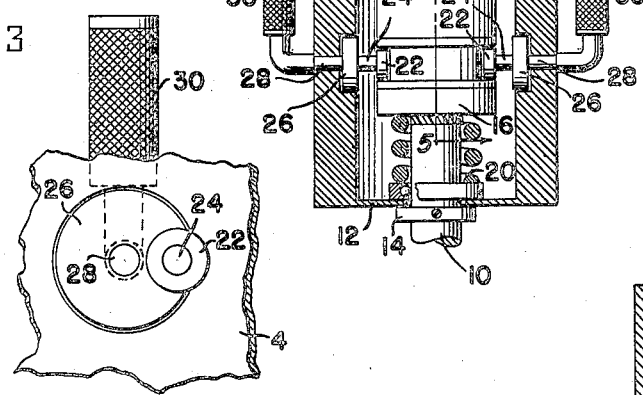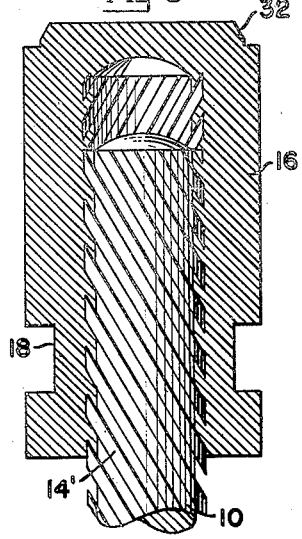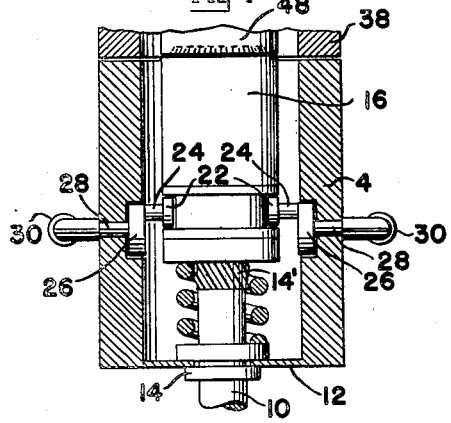

2,485,878

UNITED STATES PATENT OFFICE 2,485,878

TRACTOR-TRAILER DRIVE COUPLING

Martin J. Hanlon, Cleveland, Ohio

Application December 19, 1946, Serial No. 717,153

3 Claims. (Cl. 180—14)

My present invention relates to an improved tractor-trailer drive coupling and more particularly to a means for transmitting driving power from a tractor to a trailer so that the wheels of the trailer will be driven with the wheels of the tractor.

By so doing the trailer will be under greater control of the driver and the braking power of the engine may also be applied to the trailer wheels to maintain control. The driven trailer wheels will also provide more power with less strain and wear on the engine and other advantages will be apparent to persons familiar with the tractor-trailer type of vehicle.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Figure 1 is an elevational view of the power transmitting coupling of my invention.

Figure 2 is a vertical sectional view.

Figure 3 is an elevational view of one operating lever.

Figure 4 is a view similar to Fig. 2, and with the drive elements coupled.

Figure 5 is a vertical sectional view along line 5—5 of Fig. 2.

Referring now to the drawings I have illustrated the present preferred embodiment of my invention as comprising the extended chassis of the truck or tractor 2 and draw bar device 3 upon which is mounted the cylindrical casing 4. The extension shaft 6 from the truck drive shaft is universally coupled at 8 to the vertical shaft 10 which passes through the lower cover 12 of the casing and is secured by collar 14. The upper end of the shaft 10 is threaded at 14' for engagement with the threaded core of the drive sleeve 16. This sleeve exteriorly grooved at 18 is supported by spring 20 and is vertically adjustable with relation to the shaft 10 by bearings 22 in the groove on cranks 24 eccentric of the collars 26 on shafts 28 passing through the casing and having operating handles 30. The upper end of the sleeve is cut or otherwise formed with a male gear 32.

On the conventional turntable 34 of the trailer 36 I use a gear box 38 exteriorly grooved at 40 for support on the table. An interior wall 42 in bearings 44 journals a shaft 46 having a lower collar 48 recessed and threaded at 50 to form the female mate to the gear 32.

A beveled gear 52 secured by screw 54 on the shaft 46 engages a gear 56 secured by screw 58 on shaft 60 journaled at 62 in the tube 64 and coupled at 66 to a drive shaft 68 to the trailer wheels.

In use the tractor or truck is backed under the trailer turntable in usual manner and with the casing 4 and the box 38 aligned the elements are brought together by lowering the trailer and the handles 30 are actuated to postion of Fig. 4 to elevate the sleeve and its gear into engagement with the gear 50. Thus the rotary movement of the tractor shaft will be transmitted to the drive shaft of the trailer and the engine of the truck may power all of the wheels.

Having thus fully described my invention what I claim as new and desire to secure by Letters Patent is:

1. A truck-trailer drive coupling comprising a casing on the truck aligned with a gear box on the trailer, a drive shaft in the casing and a driven shaft in the gear box, a sleeve threadedly engaging the drive shaft, a gear on said sleeve, a mating gear on said driven shaft, said gears being movable into driving engagement by movement of said sleeve on said drive shaft, thereby effecting operation of said driven shaft from said drive shaft.

2. A truck-trailer drive coupling comprising a casing on the truck aligned with a gear box on the trailer, a drive shaft in the casing and a driven shaft in the gear box, a sleeve threadedly engaging the drive shaft and being capable of movement thereon, a gear on said sleeve and a mating gear on said driven shaft, and operating means for moving said sleeve longitudinally on said drive shaft, said mating gears being capable of engagement or disengagement by movement of said sleeve on said drive shaft, thereby effecting at will operation of said driven shaft from said drive shaft.

3. A truck-trailer drive coupling comprising a casing on the truck aligned with a gear box on the trailer, a drive shaft in the casing and a driven shaft in the gear box, a sleeve threadedly engaging the drive shaft, said sleeve being longitudinally movable with respect to said drive shaft, a gear on said sleeve, and a mating gear on said driven shaft, control means including rotatable operating handles for moving said sleeve longitudinally with respect to said drive shaft, thereby engaging or disengaging, at will, said mating gears, whereby said driven shaft may be operated from said drive shaft at will through said operating handles.

MARTIN J. HANLON.

REFERENCES CITED

The following references are of record in the file of this patent:

UNITED STATES PATENTS

| Number | Name | Date |
|---|---|---|
| 936,190 | Tuckfield | Oct. 5, 1909 |
| 1,830,840 | Kienzle | Nov. 10, 1931 |
| 1,924,723 | Nowak | Aug. 29, 1933 |
| 2,022,387 | Reid | Nov. 26, 1935 |
| 2,072,728 | Cederstrom | Mar. 2, 1937 |
| 2,099,768 | Nardone | Nov. 23, 1937 |
| 2,178,841 | Lubbers | Nov. 7, 1939 |
| 2,435,536 | Ferris | Feb. 3, 1948 |